United States Patent [19]

Wittig et al.

[11] Patent Number: 5,308,294

[45] Date of Patent: May 3, 1994

[54] HINGE JOINT WITH BEARINGS FOR THE ECCENTRIC FOR USE IN SEATS OF MOTOR VEHICLES AND THE LIKE

[75] Inventors: Werner Wittig, Winnweiler; Dirk Angermann, Cologne; Herbert Eich, Mönchengladbach; Heinz Werner, Remscheid-Hasten, all of Fed. Rep. of Germany

[73] Assignee: Keiper Recaro GmbH. & Co., Remscheid, Fed. Rep. of Germany

[21] Appl. No.: 39,836

[22] Filed: Mar. 30, 1993

[30] Foreign Application Priority Data

Apr. 7, 1992 [DE] Fed. Rep. of Germany ....... 4211617

[51] Int. Cl.⁵ .................................................. B60N 2/22
[52] U.S. Cl. ............................ 475/162; 475/177; 297/362
[58] Field of Search ............... 475/162, 175, 176, 177; 297/362

[56] References Cited

U.S. PATENT DOCUMENTS

| 1,194,288 | 8/1916 | Grisdale, Jr. ................ 475/162 X |
| 4,332,418 | 6/1982 | Strowik .......................... 297/362 |
| 4,371,207 | 2/1983 | Wilking et al. ............. 475/162 X |
| 4,538,855 | 9/1985 | Peetz et al. ................... 297/362 |
| 4,563,039 | 1/1986 | Jörg ............................... 297/362 |
| 4,887,863 | 12/1989 | Caillol ........................ 475/177 X |
| 5,005,906 | 4/1991 | Suzuki et al. ............. 475/162 X |
| 5,154,475 | 10/1992 | Kafitz .......................... 297/362 |
| 5,209,637 | 5/1993 | Reubeuze .................. 475/177 X |

FOREIGN PATENT DOCUMENTS 3013304 11/1983 Fed. Rep. of Germany .

*Primary Examiner*—Leslie A. Braun
*Assistant Examiner*—Khoi Q. Ta
*Attorney, Agent, or Firm*—Darby & Darby

[57] ABSTRACT

A hinge joint which can be installed, for example, between the body supporting portion and the back rest of the seat in a motor vehicle has a first leaf affixed to the body supporting portion, a second leaf affixed to the back rest and a horizontal pintle which pivotally connects the second leaf to the first leaf. The actuating mechanism for pivoting the second leaf comprises a pair of wedge-like sections which are biased apart to bear against the balls and/or needles of one or more antifriction bearings between the first leaf and the sections. The sections flank a motion transmitting member which is moved about the axis of the pintle in order to release the second leaf for angular movement relative to the first leaf. A centering element can be installed next to the sections between the first leaf and a sleeve of the second leaf, and the bearing or bearings can extend between such centering element and the first leaf.

9 Claims, 2 Drawing Sheets

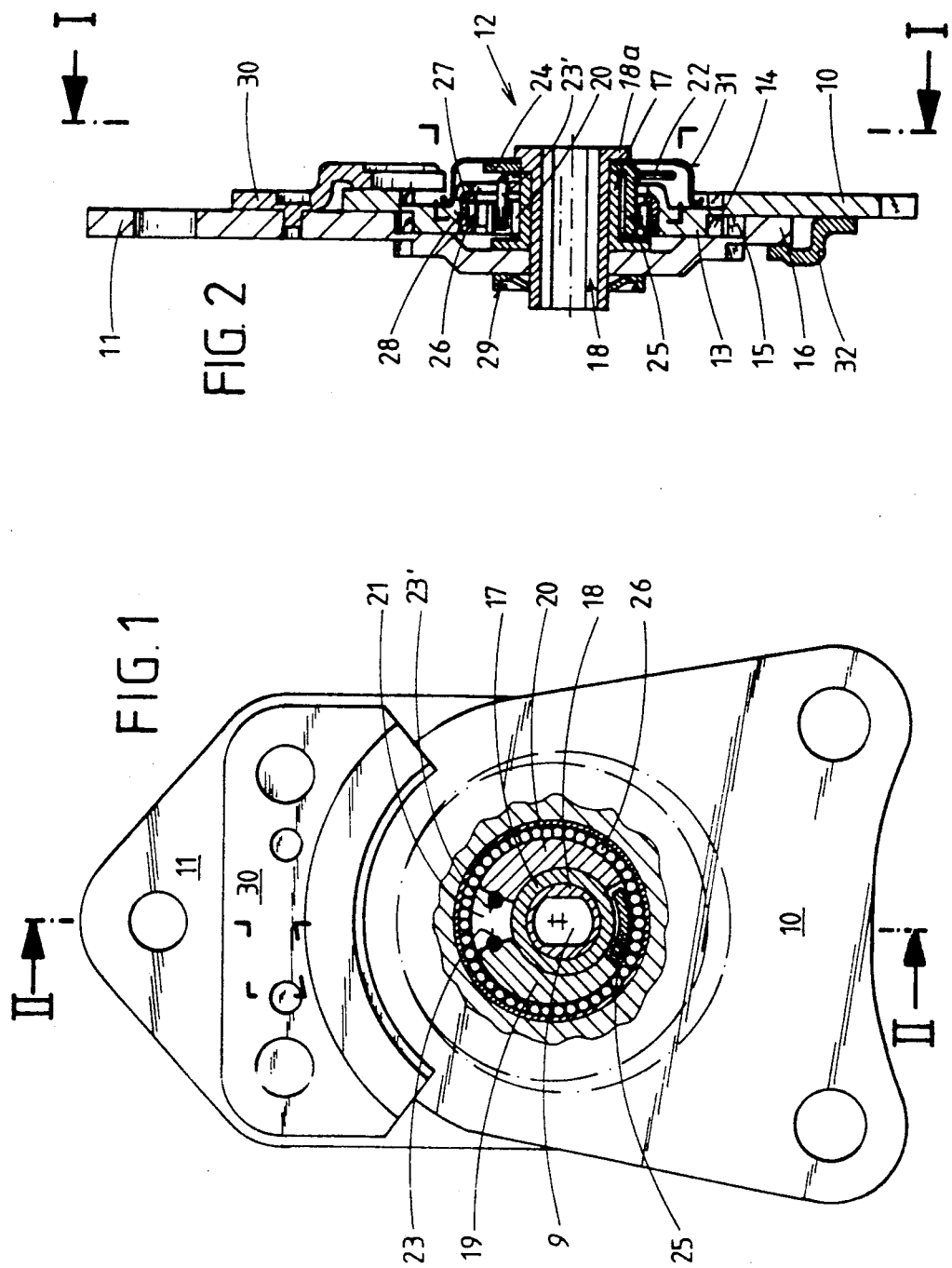

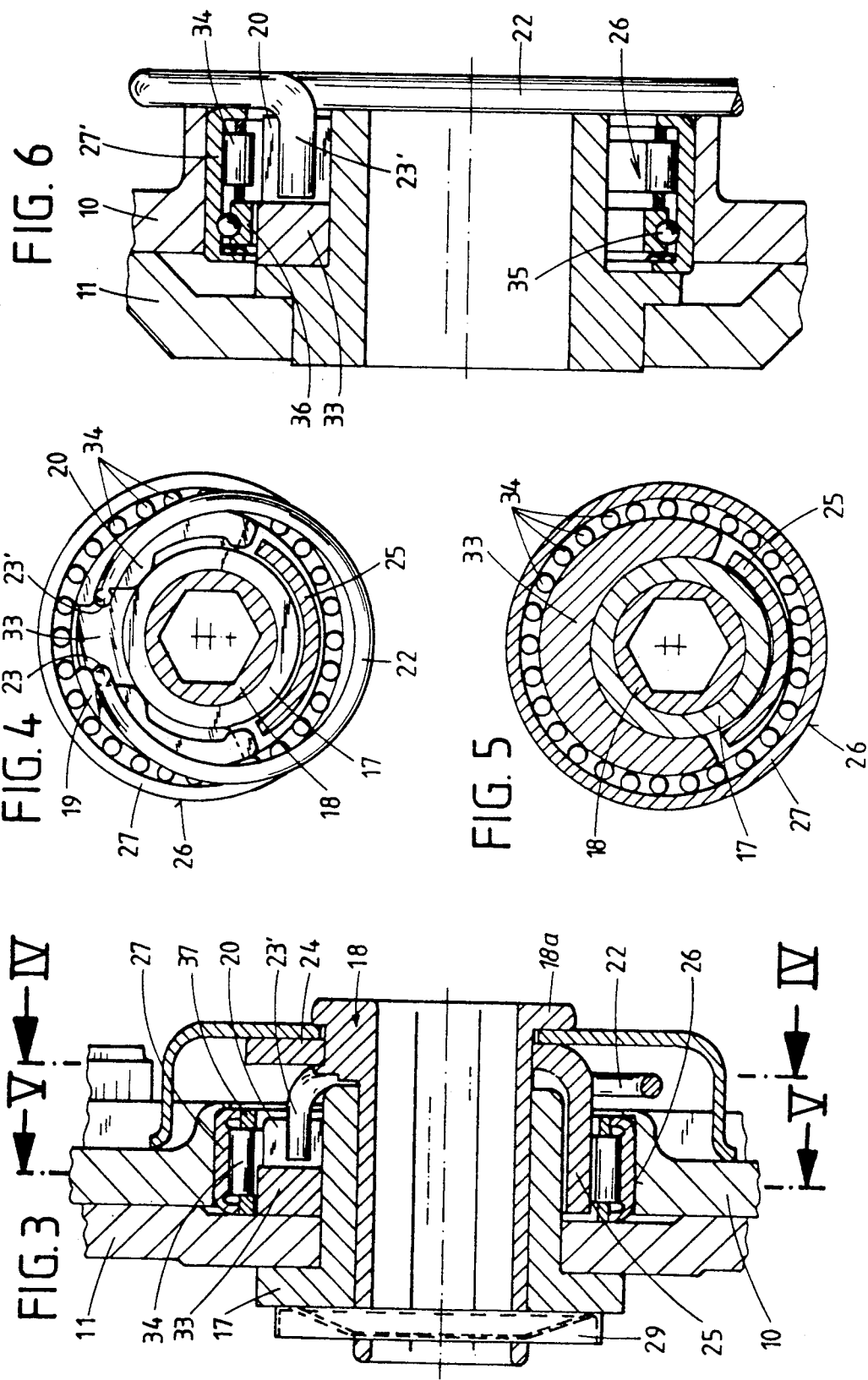

HINGE JOINT WITH BEARINGS FOR THE ECCENTRIC FOR USE IN SEATS OF MOTOR VEHICLES AND THE LIKE

BACKGROUND OF THE INVENTION

The invention relates to hinge joints which can be utilized in seats, particularly in the seats of vehicles including motor vehicles. Still more particularly, the invention relates to improvements in hinge joints which can be utilized in seats for any one of a number of different purposes including (a) pivotably connecting the back rest to the body supporting portion of a seat, (b) vertically adjustably mounting the body supporting portion, (c) tiltably mounting the body supporting portion, (d) adjustably mounting an arm rest, (e) reciprocably mounting the body supporting portion, (f) adjustably mounting a lateral portion, (g) adjustably mounting a hip supporting portion, (h) adjustably mounting a head rest or shoulder rest and/or (i) effecting simultaneous adjustments of two or more mobile parts relative to one or more stationary parts in a seat.

It is already known to provide the seat of a motor vehicle (e.g., a driver's seat and/or a seat next to the driver's seat) with a stationary component which is affixed to the frame of a vehicle and/or to the body supporting portion of the seat, with a second component which is affixed to a movable part, such as the pivotable back rest of the seat, a pintle which connects the second component to the first component for pivotal movement about a fixed axis (e.g., a horizontal axis), and a mechanism which can be actuated to adjust the second component relative to the first component and automatically locks or otherwise holds the second component in a newly selected position relative to the first component. Reference may be had, for example, to German Pat. No. 30 13 304 C2 which further discloses two substantially wedge-shaped arcuate sections partially surrounding the pintle and being biased apart by a spring which simultaneously urges the sections against a motion transmitting member. An antifriction bearing is installed between the first component and the arcuate sections. The German patent further discloses that the second section can be turned on a centric (i.e., non-eccentric) portion of the pintle. The arcuate sections cooperate with the adjacent portion of the pintle to constitute an eccentric for the first component of the patented hinge joint. The wedge-like sections cooperate with the spring to automatically establish a certain clearance when the adjusting mechanism is actuated to change the position of the second component relative to the first component, and such clearance is reduced to zero when the adjusting operation is completed. The establishment of a clearance is desirable and advantageous because it contributes to the convenience of adjustment. Nevertheless, each adjustment involves the application of a force which must suffice to overcome sliding friction between the arcuate sections and the adjacent part or parts as well as sliding friction between the pintle and one or more neighboring parts. It has been found that a person wishing to adjust the second component relative to the first component must overcome a rather pronounced initial resistance to movement of the second component relative to the first component as well as a rather pronounced resistance of the second component to continuation of its movement relative to the first component.

Commonly owned U.S. Pat. No. 5,154,475 granted Oct. 13, 1992 to Egon Kafitz for "Hinge joint for the seats of motor vehicles and the like" discloses a hinge joint wherein the eccentric between the pintle and one of the components further includes a centering element which extends between the narrower end portions of the wedge-like sections. When a coil spring between the wider end portions of the wedge-like sections is free to move such wider end portions away from each other, the sections act as a means for blocking the second component of the hinge joint against movement from a newly selected position. The bias of the spring must be overcome in order to adjust the angular position of the second component relative to the first component of the patented hinge joint. The centering element can constitute a sleeve which is surrounded by the wedge-like sections and includes a portion which is received with angular play between the narrower end portions of the wedge-like sections. The concave surfaces of the sections are in frictional sliding contact with the external surface of the sleeve. Kafitz further proposes to employ a ball bearing or a roller bearing which is installed between the sleeve and one of the two components of the patented hinge joint. In spite of the provision of a bearing, the adjustment of the hinge joint of Kafitz still necessitates the application of a relatively large initial force in order to set the second component in motion relative to the first component, namely to disengage the wedge-like sections from the adjacent surface or surfaces.

A further known proposal involves the utilization of a cupped entraining member which is partially surrounded by the wedge-like sections of the eccentric. The entraining member contains an antifriction bearing for the second component of the thus modified hinge joint. The first component surrounds the wedge-like sections. Such mounting reduces the friction between relatively movable parts when the hinge joint is to be actuated to adjust the position of the second component relative to the first component. However, the reduction of friction is not pronounced so that each and every adjustment still necessitates the application of a rather substantial force, not only to overcome the initial resistance to adjustment but also to maintain the second component in motion until such component reaches a desired new position relative to the first component.

OBJECTS OF THE INVENTION

An object of the invention is to provide a novel and improved hinge joint which is constructed and assembled in such a way that its manipulation necessitates the application of a relatively small force.

Another object of the invention is to provide a hinge joint wherein the mobile component offers a minimal resistance to displacement from a position of rest toward a newly selected position.

A further object of the invention is to provide a hinge joint wherein the mobile component offers negligible resistance to continuation of its movement relative to the other component.

An additional object of the invention is to provide a hinge joint wherein the mounting of the eccentric for one of the components constitutes an improvement over the mounting of eccentrics in heretofore known hinge joints.

Still another object of the invention is to provide a hinge joint wherein the wedge-like sections of the eccentric for one of the components generate little or no sliding friction during adjustment of the mobile component relative to the other component.

A further object of the invention is to provide a seat, such as a seat in a motor vehicle, which embodies one or more hinge joints of the above outlined character.

Another object of the invention is to provide a hinge joint wherein the wear upon the surfaces between moving and stationary parts or between movable parts which move relative to each other is reduced in a novel and improved way.

An additional object of the invention is to prolong the useful life of a hinge joint for use in the seats of motor vehicles and/or for other purposes.

Still another object of the invention is to provide a hinge joint wherein the existence of one or more clearances between relatively movable parts after the second component assumes a newly selected position relative to the other component does not adversely affect the reliability of retention of the second component in the newly selected position.

A further object of the invention is to provide a simple, compact and inexpensive hinge joint which can be utilized as a superior substitute for existing hinge joints in the seats of motor vehicles.

Another object of the invention is to provide a method of eliminating or greatly reducing sliding friction between certain parts of the above outlined hinge joint.

SUMMARY OF THE INVENTION

The invention is embodied in a joint which can be used as a hinge to articulately connect a first part and a second part, e.g., to connect the body supporting portion and the back rest of a seat in a vehicle, such as an automobile. The improved joint comprises a first component (e.g., a leaf) which is connectable with the first part, a second component (e.g., a second leaf) which is connectable with the second part, a pintle having an axis and pivotably connecting the second component to the first component, and means for pivoting the second component relative to the first component about the aforementioned axis between a plurality of different positions. The pivoting means comprises a motion transmitting member, first and second substantially wedge-like sections extending circumferentially of the pintle within one of the components and flanking the motion transmitting member, energy storing means (e.g., a torsion spring or a coil spring) reacting against one of the sections and bearing against the other section to urge the sections away from each other and toward the motion transmitting member, and means for establishing only (e.g., exclusively) rolling friction between the first and second sections on the one hand and the one component on the other hand.

The improved joint can further comprise a centering element which is adjacent the sections and is interposed between the other component and the means for establishing only rolling friction.

The means for establishing only rolling friction can comprise an outer race which is adjacent the one component and a plurality of rolling elements (such as needles) directly contacting the outer race and the wedge-like sections. The one component can be a fixed component, e.g., a leaf-like member which is bolted, riveted or otherwise affixed to or forms part of the frame of a motor vehicle.

If the joint comprises a centering element, the means for establishing only rolling friction can comprise a needle bearing between the sections and the one component and a ball bearing between the one component and the centering element. The ball bearing can include an outer race which is adjacent the one component, an inner race adjacent the centering element, and at least one set (e.g., at least one row) of spherical rolling elements between the two races.

The pivoting means can further include a substantially disc-shaped entraining member, and the motion transmitting member can constitute an extension of such disc-shaped member. For example, the motion transmitting member can constitute an arm or prong which extends in substantial parallelism with the axis of the pintle. The other component of such hinge joint can comprise a sleeve which is coaxial with and surrounds the pintle. The pivoting means can further comprise an actuating member which is rotatable in the sleeve and is rigid with the substantially disc-shaped member.

The novel features which are considered as characteristic of the invention are set forth in particular in the appended claims. The improved hinge joint itself, however, both as to its construction and its mode of operation, together with additional features and advantages thereof, will be best understood upon perusal of the following detailed description of certain presently preferred specific embodiments with reference to the accompanying drawings.

BRIEF DESCRIPTION OF THE DRAWINGS

FIG. 1 is a partly side elevational and partly transverse sectional view of a hinge joint which embodies one form of the invention, the section being taken in the direction of arrows substantially as seen from the line I—I in FIG. 2;

FIG. 2 is an axial sectional view substantially as seen in the direction of arrows from the line II—II in FIG. 1;

FIG. 3 is an enlarged fragmentary axial sectional view of a modified hinge joint;

FIG. 4 is a sectional view substantially as seen in the direction of arrows from the line IV—IV in FIG. 3, the wedge-like sections being shown in blocking positions;

FIG. 5 is a sectional view substantially as seen in the direction of arrows from the line V—V in FIG. 3, the wedge-like elements being shown in positions they assume during adjustment of the second component; and FIG. 6 is a fragmentary axial sectional view of a third hinge joint.

DESCRIPTION OF PREFERRED EMBODIMENTS

FIGS. 1 and 2 illustrate certain details of a hinge joint which embodies one form of the invention and can be utilized in a seat of a motor vehicle, for example, to articulately connect a pivotable back rest to a body supporting portion. Such hinge joints are normally employed in pairs. Reference may be had, for example, to FIG. 1 of the aforementioned commonly owned U.S. Pat. No. 5,154,475 to Kafitz. The disclosure of the patent to Kafitz, as well as of each other U.S. patent mentioned in the present application, is incorporated herein by reference. The hinge joint is constructed and assembled in such a way that it permits adjustments of the back rest relative to the body supporting portion of a seat and is also capable of reliably maintaining the back rest in a selected position.

A plate-like fixed first component or leaf 10 of the improved hinge joint is connectable with or forms part of the body supporting portion of a sat, and a second plate-like component or leaf 11 of the hinge joint is connected to or forms part of a back rest. The component 11 is pivotable relative to the component 10 about the horizontal axis of a pintle 9, and the angular position of the component 11 relative to the component 10 can be adjusted (i.e., the component 11 can be pivoted) by a mechanism 12 which is known per se and by itself forms no part of the present invention. The illustrated adjusting or pivoting mechanism 12 comprises a spur gear 13 which is an integral part of the first component 10 and can be obtained by stamping or in any other suitable way at the time the component 10 is made from a sheet-like blank of suitable metallic or other material. The external teeth 14 of the spur gear 13 mate in a certain way with the teeth 15 of an internal gear 16 which, in the embodiment of FIGS. 1 and 2, is an axially offset portion of the second component 11. The internal gear 16 can be made at the time the component 11 is formed, e.g., by removing material from a sheet-like metallic or other suitable blank. The addendum circle of the spur gear 13 is smaller than the dedendum circle of the internal gear 16, and the difference between the diameters of these circles at least equals the radial dimension of an external tooth 14, i.e., the number of teeth 14 is smaller than the number of teeth 15, and the difference between these numbers equals n wherein n is a whole number including one. This ensures that the gears 13 and 16 can roll along each other. An even more detailed description of a suitable adjusting or pivoting mechanism for use in the hinge joint of the present invention can be found, for example, in commonly owned U.S. Pat. No. 4,563,039 granted Jan. 7, 1986 to Horst Jörg for "Hinge joint for use in the seats of motor vehicles and the like".

The component 11 is fixedly connected with or is of one piece with a sleeve 17 which is coaxial with the internal gear 16 and surrounds a tubular actuating member 18 of the mechanism 12 in such a way that the member 18 is coaxial with the gear 16 and is turnable relative to the component 11. Portions of the external surface of the sleeve 17 on the component 11 are surrounded by two substantially wedge-like arcuate sections 19, 20. The space 21 between the wider end portions of the sections 19, 20 receives a biasing device 22 here shown as a torsion spring having a first leg 23 bearing against the wider end portion of the section 19 and a second leg 23′ bearing against the wider end portion of the section 20. This ensures that the narrower end portions of the sections 19, 20 are biased toward each other, namely toward a motion transmitting member in the form of a prong or extension 25 forming part of a disc-shaped member 24 and extending in substantial parallelism with the axis of the pintle 9. The disc-shaped member 24 is fixedly secured to the actuating member 18 which is turned by an operator (e.g., by way of a knob, a motor or the like) in order to select a different angular position of the component 11 relative to the component 10. The torsion spring 22 serves as a means for biasing the convex external surfaces of the sections 19, 20 directly against the adjacent rolling elements of a needle bearing 26 having an outer race 27 in a socket 28 of the spur gear 13 forming part of the fixedly mounted component 10. The sleeve 17 and the sections 19, 20 together constitute an eccentric mount for the component 10 relative to the component 11. The outer race 27 of the needle bearing 26 is or can be a press fit in the socket 28 of the spur gear 13, i.e., of the component 10.

The components 10 and 11 are held against axial movement relative to each other by two retainers 30, 32 which can be made of a suitable metallic sheet material. The retainer 30 is affixed to the component 11 and overlies a portion of the component 10; the retainer 32 is affixed to the component 10 and overlies a portion of the component 11. A washer 29 is mounted on the tubular member 18 and abuts the adjacent central portion of the component 11. This washer cooperates with an external flange 18a provide on the actuating member 18 for a cupped closure or lid 31 which engages the component 10 radially outwardly of the outer race 27 of the needle bearing 26 in the socket 28 of the spur gear 13. The washer 29 cooperates with the external flange 18a to maintain the disc-shaped member 24, the torsion spring 22 and the sections 19, 20 in fixed axial positions relative to each other. The flange 18a overlies the radially innermost portion of the disc-shaped member 24. An important function of the closure or lid 31 is to prevent penetration of foreign matter into the hinge joint, for example, to prevent penetration of lacquer during finishing of the hinge joint prior or subsequent to installation in a seat.

If the actuating member 18 is turned by a knob or by a motor, not shown, the motion transmitting extension 25 of the disc-shaped member 24 is caused to bear against the narrower end portion of one of the sections 19, 20 (i.e., of that section which is located in the path of movement of the extension 25 about the axis of the pintle 9) whereby the thus displaced section 19 or 20 causes the torsion spring 22 to store additional energy. This immediately results in a certain reduction of the eccentricity between the components 10, 11 which, in turn, renders it possible to appreciably reduce the magnitude of force which is required to change the angular position of the component 11 relative to the component 10 because the needles of the bearing 26 ensure that only rolling friction exists between the sections 19, 20 on the one hand and the component 10 on the other hand. More specifically, the rolling elements of the needle bearing 26 directly contact the convex surfaces of the sections 19, 20 and the cylindrical internal surface of the outer race 27 which, however, is a press fit in the socket 28 provided in the spur gear 13 forming part of the component 10. The absence of any other friction but rolling friction between the sections 19, 20 and the component 10 not only ensures that a relatively small force is needed to move the already moving component 11 to a preselected position or to any new position relative to the fixed component 10 but the feature that only rolling friction must be overcome further ensures that a relatively small force is needed to set the component 11 in motion for the purpose of moving this component toward and all the way to a newly selected position with reference to the component 10. Any movement of the component 11 relative to the component 10 about the pintle 9 involves a movement of the sections 19, 20 along and relative to the rolling elements of the needle bearing 26. At the same time, the internal surface of the sleeve 17 (which is rigid with the component 11) is in sliding frictional engagement with the concave internal surfaces of the sections 19 and 20. All in all, the overall reduction of friction is quite pronounced and is of considerable advantage in permitting rapid and accurate adjustment of the component 11 to a newly selected angular position with the exercise of a relatively small effort, not only to set the component 11 in motion but also to thereupon continue the movement of the component 11 to its newly selected position.

When the movement of the component 11 relative to the component 10 is terminated or interrupted, the legs 23, 23' of the torsion spring 22 immediately move the wider end portions of the sections 19, 20 away from each other and maintain the external surfaces of these sections in requisite engagement with the adjacent rolling elements of the needle bearing 26. This eliminates the radial play between the teeth 14, 15 of the gears 13, 16 as well as between the sections 19, 20 and the adjacent parts of the improved hinge joint to thus ensure reliable retention of the component 11 in the newly selected position relative to the component 10.

It will be seen that the component 10 of the hinge joint which is shown in FIGS. 1 and 2 indirectly bears against the sections 19 and 20 not only when the angular position of the component 11 is being changed but also while the component 11 dwells in a newly selected angular position. In order to further reduce the magnitude of the force which is required to carry out angular adjustments of the component 11 relative to the component 10, the hinge joint of FIGS. 1 and 2 can be modified in a manner as disclosed in the aforementioned commonly owned U.S. Pat. No. 5,154,475 to Kafitz, namely by the provision of a centering element such as the substantially sickle-shaped centering element 33 of the hinge joint which is shown in FIGS. 3, 4 and 5. The centering element 33 props one of the components 10, 11 during actual adjustment of the component 11. The mounting of the centering element 33 is such that it also engages a portion of the bearing which ensures that only rolling friction develops between the sections 19, 20 and the component 10 while the component 11 is in the process of moving toward a different angular position.

All such parts of the hinge joint of FIGS. 3-5 which are identical with or clearly analogous to corresponding parts of the hinge joint of FIGS. 1 and 2 are denoted by similar reference characters. The sleeve 17 is fixedly connected to or made of one piece with the pivotable component 11. The latter comprises an internal gear in mesh with the spur gear of the component 10. The external surface of the sleeve 17 is adjacent the internal surfaces of the arcuate wedge-like sections 19, 20 which are biased apart by the legs 23, 23' of the torsion spring 22 and have end portions flanking the extension 25 of the disc-shaped member 24. The centering element 33 is adjacent the external surface of the sleeve 17 and is immediately axially adjacent the sections 19, 20. As can be best seen in FIGS. 4 and 5, the centering element 33 extends radially between the sleeve 17 and the rolling elements in the form of needles 34 forming part of a bearing 26 including an outer race 27 in the socket of the fixed component 10. The centering element 33 can be said to constitute a third part of an eccentric which further includes the sections 19, 20 and has an axis which is parallel to the axis of the pintle, i.e., to the common axis of the sleeve 17 and tubular member 18.

The needle bearing 26 in the hinge joint of FIGS. 3 to 5 can further comprise a cage 37 for the needles 34. The needles 34 are in direct rolling contact with the convex external surfaces of the centering element 33 and wedge-like sections 19, 20.

The tubular actuating member 18 is rigid with the disc-shaped member 24 which carries the motion transmitting extension or prong 25, and the latter is located between the wider end portions of the sections 19 and 20. The functions of the actuating member 18 as well as of the disc-shaped member 24 and its extension 25 are the same as described with reference to the embodiment of FIGS. 1 and 2.

FIG. 4 shows that a relatively narrow clearance remains between the convex external surface of the centering element 33 and the adjacent needles 34 when the pivotable component 11 is at a standstill. Such clearance develops at the radially outermost portion (lobe) of the eccentric including the centering element 33 and the sections 19, 20. This ensures that, when the adjustment of the component 11 involves a positioning of certain parts as shown in FIG. 5, there also develops a play or clearance between the teeth 14 and 15 of the spur gear on the component 10 and the internal gear of the component 11.

Referring to FIG. 6 there is shown a portion of a third hinge joint wherein the means for establishing only rolling engagement between the arcuate wedge-like sections 19, 20 (only the section 20 can be seen in FIG. 6) and the centering element 33 on the one hand, and the fixed component 10 on the other hand, includes a needle bearing 26 between the component 10 and the sections 19, 20 as well as a ball bearing with spherical rolling elements 35 between the centering element 33 and the component 10. In all other respects, the hinge joint of FIG. 6 is or can be identical with the hinge joint of FIGS. 3 to 5. The two bearings could constitute two separately produced and separately installed devices. However, and as actually shown in FIG. 6, it is also possible to provide a common outer race 27' for the needles 34 of the bearing 26 and for the spherical rolling elements 35 of the ball bearing. The latter could have two or more annuli of rolling elements. The ball bearing further comprises an inner race 36 between the rolling elements 35 and the centering element 33. The axial length of the illustrated inner race 36 is such that this race does not extend between the needles 34 and the convex external surfaces of the sections 19 and 20.

An important advantage of the improved joint is that the friction which must be overcome in order to pivot the component 11 relative to the component 10 is reduced to a small fraction of that friction which is necessary in heretofore known joints to change the angular position of the second component. Thus, the external surfaces of the sections 19, 20 and of the centering element 33 (if such centering element is used) are in mere rolling contact with the adjacent part or parts (needle bearing or needle bearing in combination with a ball bearing). Only the internal surfaces of the sections 19, 20 and centering element 33 are in sliding contact with the sleeve 17 of the second component 11. As can be readily seen in FIG. 3, the diameter of the external surface of the sleeve 17 is small in comparison with the diameter of the annulus formed by the needles 34 of the bearing 26; this also ensures that the sliding friction between the sleeve 17 on the one hand and the sections 19, 20 and centering element 33 on the other hand is relatively small.

The utilization of a needle bearing without an inner race not only contributes to a further reduction of friction but also reduces the cost of the needle bearing without adversely affecting its function. However, it is equally within the purview of the invention to replace the needle bearing with one or more ball bearings, to employ a plurality of needle bearings, or to employ one or more needle bearings and one or more ball bearings.

As can be seen in FIGS. 3 to 5, the axial length of each needle 34 can be selected in such a way that each needle extends axially substantially along the entire external surface of the centering element 33 as well as along the entire external surface of the sections 19 or 20. However, the axial length of the needles 34 can be increased beyond that shown in FIG. 3 or reduced to less than that shown in FIG. 3 without departing from the spirit of the invention.

Still further, the positions of the bearings which are shown in FIG. 6 can be reversed, i.e., the needle bearing 26 can surround the centering element 33 and the ball bearing can surround the sections 19, 20. Moreover, and in order to reduce the likelihood of uncontrolled displacement of rolling elements, each of the two bearings which are shown in FIG. 6 can be provided with a cage or with other suitable confining means for the respective rolling elements, i.e., with a first cage (such as the cage 37 of FIG. 3) for the needles 34 and a second cage for the spherical rolling elements 35.

The improved hinge joint is susceptible of numerous additional modifications without departing from the spirit of the invention. For example, the features of the hinge joint of FIGS. 1-2 can be combined with those of the hinge joint which is shown in FIGS. 3-5 and/or in FIG. 6, and the features of the hinge joint of FIGS. 3-5 can be combined with those of the hinge joint of FIG. 6. Still further, the improved hinge joint can embody the features of the referenced patents and/or other U.S. patents owned by the assignee of the present application.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A hinge joint for use in the seats of vehicles, comprising a first component; a second component; a pintle having an axis and pivotally connecting said second component to said first component; and means for pivoting said second component about said axis between a plurality of different positions, including a motion transmitting member, first and second substantially wedge-like sections extending circumferentially of said pintle within one of said first and second components and flanking said motion transmitting member, said wedge-like sections and said member together forming an eccentric section, energy storing means reacting against one of said sections and bearing against the other of said sections to urge said sections away from each other and toward said member, and means for establishing substantially only rolling friction between said wedge-like sections and said one component, said means for establishing such rolling friction comprising an annular outer race surrounded by said one component and a plurality of rolling elements directly contacting said outer race and an outer periphery of said wedge-like sections.

2. The joint of claim 1, further comprising a centering element axially adjacent said sections and radially interposed between the other of said components and said means for establishing substantially only rolling friction.

3. The joint of claim 1, wherein said one component is fixed and the other of said components is pivotable about said axis relative to said one component.

4. The joint of claim 1, wherein said rolling elements include needles.

5. The joint of claim 1, wherein said pivoting means further comprises a substantially disc-shaped member and said motion transmitting member constitutes an extension of said substantially disc-shaped member.

6. The joint of claim 5, wherein said extension includes a prong extending in substantial parallelism with said axis.

7. The joint of claim 5, wherein the other of said components has a sleeve which surrounds said pintle and said pivoting means further comprises an actuating member rotatable in said sleeve and rigid with said substantially disc-shaped member.

8. A hinge joint for use in the seats of vehicles, comprising a first component; a second component; a pintle having an axis and pivotally connecting said second component to said first component; and means for pivoting said second component about said axis between a plurality of different positions, including a motion transmitting member, first and second substantially wedge-like sections extending circumferentially of said pintle within one of said first and second components and flanking said motion transmitting member, said wedge-like sections and said member together forming an eccentric section, energy storing means reacting against one of said wedge-like sections and bearing against the other of said wedge-like sections to urge said sections away from each other and toward said member, and means for establishing substantially only rolling friction between said wedge-like sections and said one component further comprising a centering element axially adjacent said wedge-like sections and radially disposed between the other of said components and said means for establishing substantially only rolling friction including at least one needle bearing between said sections and said one component and at least one ball bearing between said one component and said centering element.

9. The joint of claim 8, wherein said ball bearing comprises an outer race adjacent said one component, an inner race adjacent said centering element, and at least one set of spherical rolling elements between said races.

* * * * *